E. G. HODGES.
MEANS FOR CONTROLLING FUEL MIXTURES FOR EXPLOSIVE ENGINES.
APPLICATION FILED OCT. 22, 1917.
1,323,766.
Patented Dec. 2, 1919.
2 SHEETS—SHEET 2.
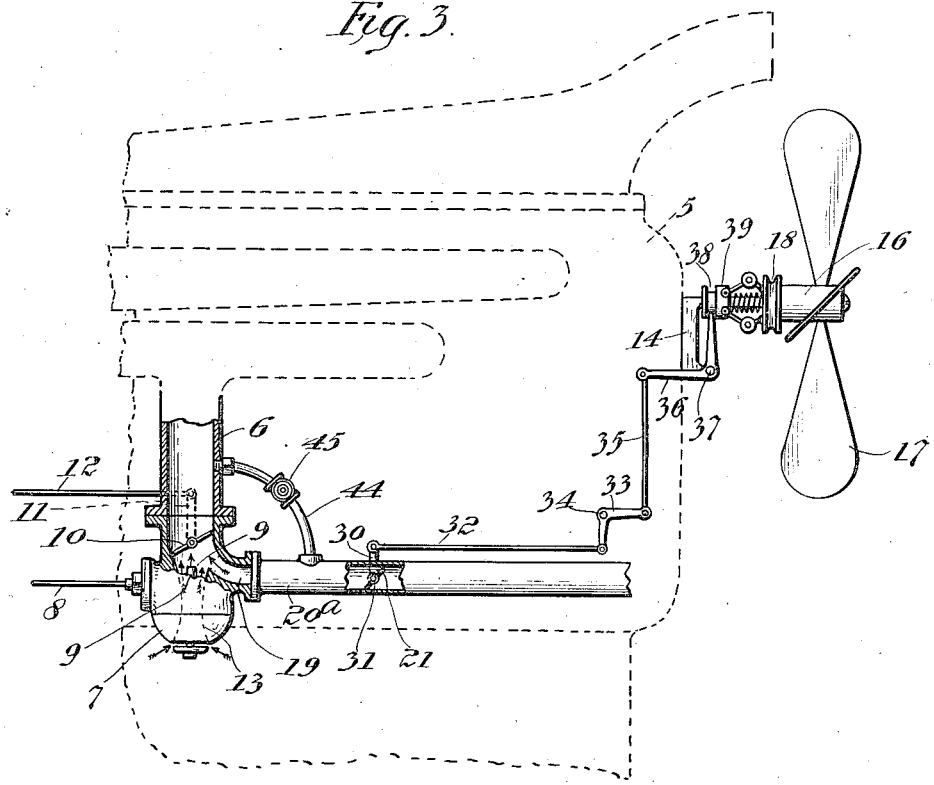
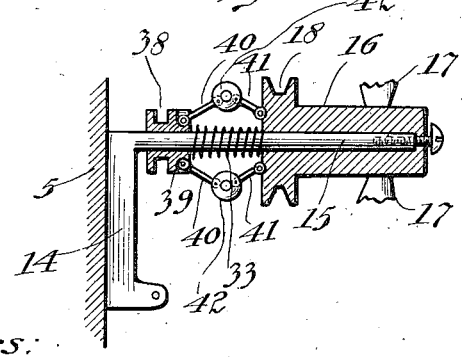
Witnesses:
W. C. Smith
L. E. Housholder
Inventor:
Edward G. Hodges
By Jno. G. Elliott
Atty.

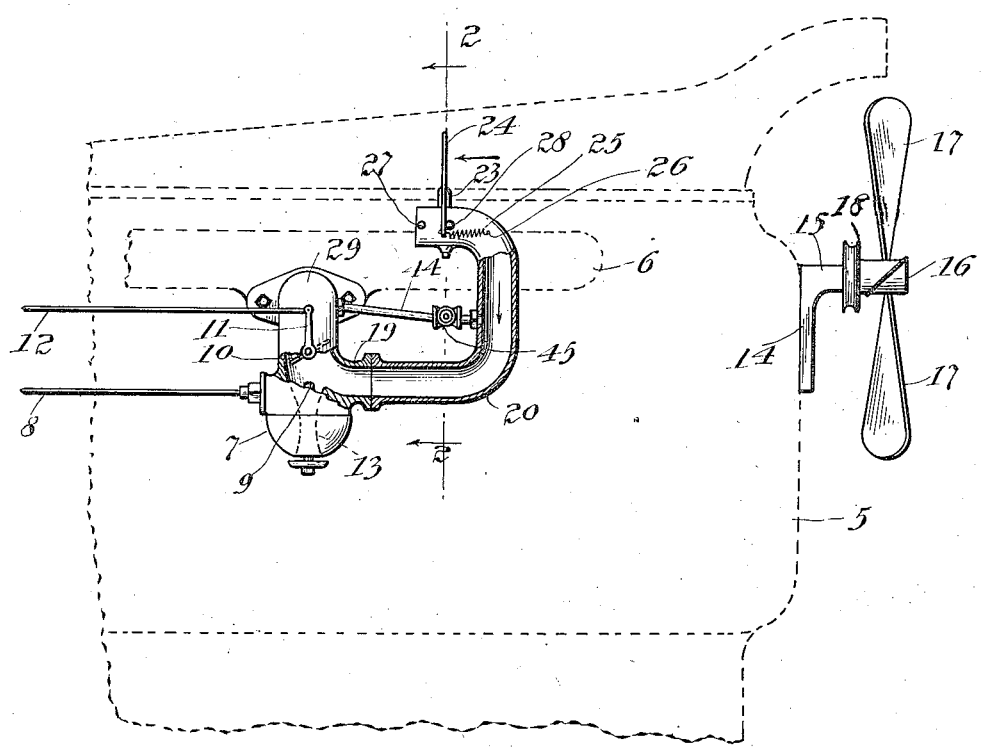
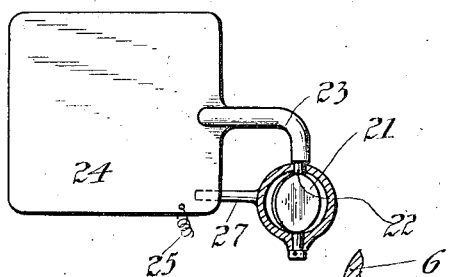
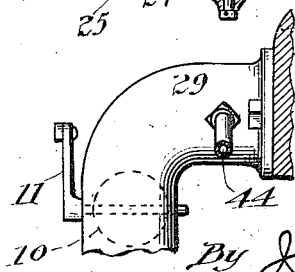

UNITED STATES PATENT OFFICE.

EDWARD G. HODGES, OF MARSHALLTOWN, IOWA.

MEANS FOR CONTROLLING FUEL MIXTURES FOR EXPLOSIVE-ENGINES.

1,323,766.   Specification of Letters Patent.   Patented Dec. 2, 1919.

Application filed October 22, 1917. Serial No. 197,897.

*To all whom it may concern:*

Be it known that I, EDWARD G. HODGES, a citizen of the United States, and resident of Marshalltown, in the county of Marshall and State of Iowa, have invented certain new and useful Improvements in Means for Controlling Fuel Mixtures for Explosive-Engines, of which the following is a full, clear, and exact specification.

This invention relates to improvements in means for controlling fuel mixtures for explosive engines, for supplying air to the carbureted gases, in means for forming a proper mixture necessarily varying throughout the several speeds of the engine, the means for controlling which air supply has heretofore been confined to the movement of the throttle lever, and other control levers attached to the dash or steering post of an automobile, and which have not been successful for reasons hereinafter appearing.

Having in mind that the suction of explosive engines is relied upon for supplying such an engine with its gaseous fuel; that the carbureted gases increase in richness with the speeding up of the engine and must be accordingly thinned with air to produce a proper mixture, it is apparent that any means by which it is possible and practical to automatically vary and maintain such a mixture throughout the several speeds of an engine will be a material and substantial advance in the art.

The prime object of this invention, broadly stated, is to utilize the speed of an explosive engine through the medium of the fan, for automatically regulating and controlling a supply of air necessary for furnishing the engine with the proper mixture during and throughout all of its speeds and in all positions of the engine throttle, on both light and heavy pull, and which is adapted for engines varying in both size and type.

Most specifically stated, the object of my invention is to provide a means by which either the velocity of the cooling fan of such an engine or the force of the fan blast therefrom may be utilized for progressively thinning the mixture with the speeding up of the engine and whereby there may be obtained a proper mixture throughout the operation of the engine and a combustion so nearly perfect as to prevent the possibility of carbon deposits therein, and a corresponding saving in fuel.

A further object is to provide means whereby an additional supply of air introduced into the rising carbureted gases may be supplied either alternately or concurrently below and above the throttle valve of the carbureter.

With these ends in view, my invention finds embodiment in certain features of novelty in the construction, combination and arrangement of parts by which the said objects and certain other objects are obtained, as hereinafter set forth and described with reference to the accompanying drawings and more particularly pointed out in the claims.

In the drawings:

Figure 1 illustrates in side elevation, partly in section, a device for regulating and controlling the supply of air to the carbureted gases ascending to an explosive engine, in which my invention finds embodiment.

Fig. 2 is an enlarged detailed section through the upper portion only of the air supply pipe, taken on the line 2—2 of Fig. 1, looking in the direction of the arrows.

Fig. 3 illustrates in side elevation, partly in section, a modified form of construction embodying my invention.

Fig. 4 is an enlarged detailed section taken longitudinally through the governor and the axle for the fan.

Fig. 5 shows a front elevation of the fuel mixture passage.

Similar characters of reference indicate the same parts in the several figures of the drawings.

The explosive engine 5, indicated in the drawings, is one of a number of types of such engines commonly used for automobiles, to the intake manifold 6 of which carbureted gases are supplied from a carbureter 7, to which the liquid fuel is supplied through a pipe 8, and discharged therein through a spray nozzle 9, opposed as usual by a throttle valve 10, connected by an arm 11, with a rod 12, adapted to be operated from some suitable source for controlling the opening of the throttle.

The nozzle 9 is surrounded by an air supply passage, indicated in dotted lines at 13, through which air is conducted and mixed with the vapors sprayed from the nozzle, and as far as may be before passing the throttle valve 10.

Secured to the front end of the engine is a bracket 14, from which projects a shaft 15, providing a bearing for the hub 16 of a fan 17 commonly employed for cooling automobile radiators, the hub of which fan has secured to the inner end thereof a pulley 18 for a belt, not shown, operated in the usual manner for driving the fan.

The carbureter, as shown in Figs. 1 and 2, is provided with a tubular intake passage 19, located below the throttle valve 10, and which is adapted to discharge air therefrom upwardly with and into the vapors rising from a nozzle, to which tubular inlet is secured an air supply pipe 20, which is substantially U-shaped in form and opening toward the rear of the engine. In Fig. 3 the supply pipe 20$^a$ is shown in somewhat different form.

Located in the pipe 20 or 20$^a$ as the case may be and adjacent its open end is a butterfly valve 21, the pivoting rod 22 for which valve projects upwardly through the pipe and has secured thereto an angular arm 23, to which is fixed a vane 24, of sheet metal or other suitable material.

The surface of this vane is normally maintained in the path of and at a right angle to the currents of air produced by the operation of the fan, by means of a coil spring 25, one end of which is secured to the vane and the other to some suitable fixed support, as for example the pipe 20, by means of a pin 26, as indicated in Fig. 1.

Projecting from the pipe and in the path of movement of the vane are stop pins 27 and 28, of which the pin 27 restricts the vane from being moved beyond a line oblique to the path of the currents of air from the fan, and the stop pin 28 to a movement beyond that which will position the vane at a right angle to the path of such currents. The vane is normally maintained in the latter position by the spring 25.

The carbureters both in the preferred and modified constructions are connected directly with the intake manifold, the only difference being that, as shown in Fig. 1, the upper portion of the manifold is bent to connection with an intake manifold cast inside the body of the motor, whereas, as shown in Fig. 5, the carbureter connects with an intake manifold located outside of the body of the motor by a passage 29.

With the use of the butterfly valve 21 in the air supply pipe 20, there is necessarily leakage, which is sufficient in the present instance for producing a proper mixture in the initial starting of the engine and until, with the speeding up of the engine and with it the fan, the currents of air are sufficient to overcome the resistance of the spring 25 and to swing the vane 24 upon its axis away from its normal position, and the butterfly valve toward an open position, with the result that the supply of air to the carbureter and intake manifold for thinning the mixture to a degree sufficient to produce a proper mixture progressively increases as the speed of the engine is increased, and reaches its maximum when and only when the engine is running at its highest speed, and until which time the vane is not moved to a position parallel with the air currents of the fan.

As the speed of the engine is reduced and with it the velocity of the fan, the force of the currents of air from the fan are correspondingly decreased and the vane 24 accordingly moves toward its closed position, and with it the winged valve to its normally closed position.

From the foregoing, it will now be apparent that my invention provides for the first time any means by which variations in the several speeds of an engine have been successfully utilized for automatically varying, controlling, and maintaining a proper mixture throughout its several speeds, from the highest to the lowest of its speeds.

My invention, however, is not limited to the use of air currents from the fan as the medium through which the valve in the air supply passage is regulated and controlled by the speed of the engine, for, as will now be pointed out, the same results may be produced through the medium of a mechanical connection between the hub of the fan and said valve.

In other words, instead of bending the supply pipe 20 as in Figs. 1 and 2, it is extended in a straight line, and the butterfly valve located therein a short distance from the carbureter and provided with a crank arm 30 secured to its shaft 31, and pivotally connected by a line 32 with one arm of a bell crank 33 pivoted to a pin 34, the other arm of which is pivotally connected by a link 35 with one arm of a bell crank 36, working on a pivot 37 secured to the bracket 14, the other arm of which projects upwardly into a peripheral groove 38, in a block 39, slidable on the shaft 15.

Pivoted to the block 39 are arms 40—40, and to the pulley 18, arms 41—41, pivotally connected with arms 40—40 as indicated at 42.

Abutting against the block 39 and the pulley 18 is a spring 43, coiled about their shaft 15, the tension of which spring is sufficient to prevent the operation of the governor until in the speeding up of the engine a supply of air through the pipe 20 is required for producing a proper mixture and whereupon the governor will operate to move the block on the shaft toward the fan and through the bell crank and link connection with the valve, causing the valve to move toward an open position.

As the velocity of the fan is increased with the speeding up of the engine, the valve 21 will be accordingly moved more and more toward its open position, and on the other hand be actuated by the operation of the governor toward a closed position as the speed of the engine decreases.

In short, the velocity of the fan and the operation of the governor vary with the different speeds of the engine, and when connected with the valve in the air supply pipe as shown in Figs 3 and 4, each of the several different speeds of the engine compels the formation of the necessary and proper mixture, which is adapted for obtaining the very best obtainable results in the operation of the engine, for economizing fuel, securing the greatest amount of mileage from a given amount of fuel, preventing carbon deposits, and correspondingly reducing the liability of the engine to overheat.

In order to provide a means for supplying air to the carbureted gases and mixture above the throttle valve of the carbureter, when for any reason this may be desirable, the manifold, shown in Fig. 1, and the intake manifold, shown in Fig. 3, may be connected with the air supply pipe by means of a branch pipe 44, and having therein a globe valve 45 of common form, for closing the branch pipe 44 when there is no occasion to suppply air to the rising fuel above the throttle valve of the carbureter.

As shown in Fig. 3, the pipe 20 may be located in contact with the heated surfaces of the engine and open at any point best adapted for utilizing the heat products of the engine for raising the temperature of the air in its passage through the pipe, when for any reason this may seem desirable or necessary.

While I have shown in Fig. 3 that the valve 21 is mechanically connected with the fan, my invention is not limited to such connection or the special devices illustrated therefor when obviously the same results would accrue through a connection of the valve with the crank shaft of the engine or any other device thereof, changing its speeds with the speed of the engine.

In conclustion, it should be understood that the air supply pipe in both constructions, may, for the purpose of raising the temperature of the air passing therethrough, be extended to or connected with any part of the motor, to pick up hot air and vapors when so desired Having described my invention, what I claim and desire to secure by Letters Patent is:

1. In a device of the class described, the combination of an internal combustion engine having a fan; a carbureter; and a fuel mixture passage leading from the carbureter to the engine; with an air intake pipe communicating with said passage; a valve in said pipe; means for regulating said valve according to the speed of the engine; a throttle valve in said passage between the discharge end of said pipe and the engine; and a by-pass communicating with said air intake pipe between the valve therein and the fuel mixture passage, and communicating with the fuel mixture passage between the valve therein and the engine.

2. In a device of the class described, the combination of an internal combustion engine having a fan; a carbureter; and a fuel mixture passage leading from the carbureter to the engine; with an air intake pipe communicating with said passage; a valve in said pipe; means for regulating said valve according to the speed of the engine; a throttle valve in said passage between the discharge end of said pipe and the engine; a by-pass communicating with said air intake pipe between the valve therein and the fuel mixture passage, and communicating with the fuel mixture passage between the valve therein and the engine; and means for controlling the flow of air through said by-pass.

In witness whereof I have hereunto set my hand and affixed my seal.

EDWARD G. HODGES. [L. S.]

Witnesses:
R. H. BROWN,
GEO. N. CARR.